United States Patent [19]

Koike et al.

[11] Patent Number: 5,382,448
[45] Date of Patent: Jan. 17, 1995

[54] METHOD OF MANUFACTURING OPTICAL TRANSMISSION MEDIUM FROM SYNTHETIC RESIN

[75] Inventors: Yasuhiro Koike, 1-31-30, Ohokayama, Meguro-ku, Tokyo 152; Eisuke Nihei, Kawasaki, both of Japan

[73] Assignees: Yasuhiro Koike; Nippon Petrochemical Co., Ltd., both of Tokyo, Japan

[21] Appl. No.: 215,386

[22] Filed: Mar. 21, 1994

Related U.S. Application Data

[63] Continuation of Ser. No. 839,775, Apr. 16, 1992, abandoned.

[30] Foreign Application Priority Data

Aug. 16, 1990 [JP] Japan .................. 2-216360

[51] Int. Cl.⁶ .............................. B05D 5/06
[52] U.S. Cl. ................... 427/163.2; 427/167; 427/230; 427/256; 427/385.5; 427/400
[58] Field of Search .......... 427/163, 230, 164, 400, 427/385.5, 256

[56] References Cited

U.S. PATENT DOCUMENTS

| | | | |
|---|---|---|---|
| 3,711,456 | 1/1973 | Gilbert et al. | 427/163 |
| 3,816,160 | 6/1974 | Moore | 427/163 |
| 3,955,015 | 5/1976 | Ohtsuka et al. | 427/163 |
| 3,999,834 | 12/1976 | Ohtomo et al. | 427/163 |
| 4,884,866 | 12/1989 | Hashimoto et al. | 427/163 |

FOREIGN PATENT DOCUMENTS 59-152406  8/1984  Japan .

*Primary Examiner*—Janyce Bell
*Attorney, Agent, or Firm*—Scully, Scott Murphy & Presser

[57] ABSTRACT

A method of manufacturing a multimode optical transmission medium from a synthetic resin having the distribution of refractive index varying continuously in a fixed direction. In the method, a monomer is polymerized while a transparent polymer for constituting the wall of a vessel is being dissolved into the monomer. Therefore, this method is free from the defect of methods using conventional polymerization reactions, and has an extremely high productivity.

4 Claims, 1 Drawing Sheet

METHOD OF MANUFACTURING OPTICAL TRANSMISSION MEDIUM FROM SYNTHETIC RESIN

This is a continuation of copending application(s) Ser. No. 07/839,775 filed on Apr. 16, 1992, now abandoned.

TECHNICAL FIELD

This invention relates to a method of manufacturing a multimode optical transmission medium made of a transparent synthetic resin, which transmission medium has the optional distribution of refractive index varying continuously in a fixed direction. More particularly, the invention relates to a method of manufacturing a multimode optical transmission medium having the distribution of refractive index varying continuously in a fixed direction, in which a monomer is polymerized while the transparent polymer constituting the wall of a vessel is dissolved in the monomer.

BACKGROUND ART

The optical transmission medium having the distribution of refractive index varying continuously in a fixed direction, are widely used as bar lenses having the function of convex lens, bar lenses having the function of concave lenses and broad band optical transmission fibers. Among them, the optical transmission media made of transparent synthetic resins are more widely used in recent years because they have several advantages in the lightness in weight, economy, easy handling, high impact resistance and flexibility, as compared with those made of quartz.

The optical transmission media are roughly classified into a single mode type and a multimode type in view of the modes of transmission of light rays. The radius of core of multimode type medium is sufficiently large as compared with the wave length of light ray to be transmitted. Accordingly, it can transmit light rays of a plurality of modes. The multimode type media are further divided, according to the mode of gradient of refractive index, into a step index type in which the refractive index is varied step by step between the core and clad and a graded index type in which the refractive index is gradually and continuously varied.

Concerning the method of producing plastics-made optical transmission media of multimode graded index type by polymerization in specific reaction vessels, there are proposed the following methods in the conventional art.

In Japanese Patent Publication No. 52-5857 (U.S. Pat. No. 3,955,015), a monomer to form a polymer of a different refractive index is subjected to diffusional transfer into a specific transparent solid substance in a polymerization process having a previously formed three-dimensional network structure. After that, the whole polymerization reaction is stopped to obtain an optical transmission medium of refractive index distribution type.

In this method, however, it is necessary that the transparent solid substance is previously made into three-dimensional network structure using a multifunctional radical polymerizable monomer, in order to maintain the configuration of the transparent solid substance. For this reason, it must previously be made separately, which costs much labor. In addition, the obtained polymer of three-dimensional network structure is not good in thermo-plasticity and it is not suitable for drawing and other post-forming processes. In other words, practical plastics-made optical transmission fibers should have stiffness and tensile strength as fiber materials in the drawing step of manufacturing process. However, the optical transmission medium prepared through the above process has inherently three-dimensional network structure, so that it is not suitable for drawing.

In Japanese Patent Publication No. 54-30301 and Japanese Laid-Open Patent Publication No. 61-130904 are proposed methods for producing optical transmission media having refractive index gradients paying attention to the difference between the monomer reactivity ratios: $r_1$ and $r_2$ of two kinds of monomers.

In the above methods utilizing the difference between the monomer reactivity ratios of monomers, it is desirable that the difference between the radical copolymerization reactivity ratios of $r_1$ and $r_2$ is large, as a result, the formation of homopolymer occurs at first and macromolecules of homopolymer are formed with causing phase separation, which sometimes makes the obtained optical transmission medium clouded to reduce the optical transmission efficiency.

When too large monomer reactivity ratios are selected, one of monomers must be the one having a low rate of polymerization such as vinyl benzoate and vinyl o-chlorobenzoate used in the example of Japanese. Patent Publication No. 54-30301, and vinyl phenylacetate used in the example of Japanese Laid-Open Patent Publication No. 61-130904. The use of monomers whose monomer reactivity ratios are largely different means that monomers of considerably low reactivity are used in copolymerization. As a result, the monomer having high reactivity is firstly polymerized and the monomer having low reactivity remains in a high concentration in the final stage of polymerization. Thus, it takes much time to complete the polymerization and, in an extreme case, the removal of remaining monomer is required.

In addition, the existence of residual monomer causes several undesirable influences on mechanical characteristics of transmission media such as tensile strength, elongation and stiffness, and the long term stability of transmission media owing to the postpolymerization or decomposition of residual monomer.

The present inventors have carried out extensive investigations concerning the process to form copolymer resins by radical reaction. When the viscosity of monomer liquid rises and the liquid turns into gel with the progress of the polymerization of monomers, the growing polymer radical is hardly diffused in the gel because the molecular weight of the polymer radical is large. In this case, the termination reaction in the radical reaction between two molecules of growing polymer radicals hardly proceeds, as a result, the rate of polymerization increases. In this state, in order to propagate the growing polymer radical further by polymerization, it is necessary that the starting monomer is diffused in the gel and the growing polymer radical is continuously supplied with the starting monomer.

The above phenomenon is accepted as the so-called gel effect in the radical polymerization. When radical polymerization is carried out so that the gel effect is produced from any terminal point of a reaction liquid in the reaction vessel, the polymerization proceeds in a certain direction from an optional point step by step and finally the progress of the polymerization reaches the other end portion.

The present inventors have made further investigations concerning the process of polymerizing a monomer in a vessel made of a polymer which can be dissolved in the monomer to be polymerized. More particularly, the polymer in the wall of the vessel is dissolved into the monomer and the dissolved polymer is selectively discharged from the gel. During the polymerization, the dissolving of the vessel wall is continued and it is discharged out of the gel. The concentration of the discharged polymer is gradually lowered as the distance from the wall increases. As the result, the distribution of composition of an obtained polymer is continuously varied in the direction of the progress of polymerization relative to the fed monomer.

In view of the above-described facts, the inventors of the present application have accomplished a method of manufacturing an optical transmission medium made of a synthetic resin with a novel method of copolymerization.

The present invention can eliminate several disadvantages in the methods of manufacturing optical transmission media of refractive index distribution type by the conventional polymerization process, and with utilizing the novel findings on the states of polymerization, the present invention attains the object to provide a method of manufacturing a multimode optical transmission medium having excellent continuous distribution of refractive index with high productivity.

BRIEF DESCRIPTION OF DRAWINGS

Each of FIG. 1

DISCLOSURE OF INVENTION

Figure 1:
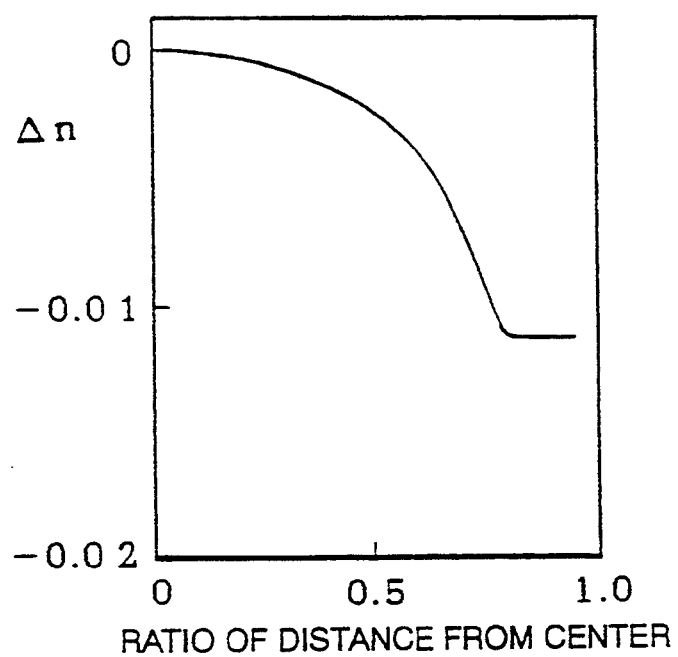

The present invention relates to a method of manufacturing a plastics-made graded index type optical transmission medium having the distribution of refractive index varying continuously in a fixed direction, which is attained by lowering the concentration of transparent polymer in a produced resin in the direction of the movement of gel, and characterized in that a vessel made of a transparent polymer is fed with a monomer which dissolves the transparent polymer and the difference between the refractive index of the transparent polymer and that of the homopolymer of the monomer to dissolve the transparent polymer is at least 0,005 and that radical polymerization of the monomer is carried out with dissolving the transparent polymer into the monomer and shifting gradually the gel layer from the vessel wall to the inner portion of the vessel.

A second characteristic point according to the present invention is that the solubility parameter $\delta_M$ of the monomer and the solubility parameter $\delta_P$ of the polymer constituting the vessel meet the following equation.

$$|\delta_M - \delta_P| < 5 \text{ (cal/cm}^3\text{)}^{\frac{1}{2}}$$

The present invention will be described in more detail.

In the present invention, a specific monomer is fed into a vessel, which vessel may be in any configuration such as column, square body or sphere, preferably column, and more preferably cylinder. The radical copolymerization is then caused to proceed from an inside wall portion of the vessel to other part such as an inner part of the vessel utilizing the gel effect. The sizes of the vessel are not limited, that is, a vessel of optional sizes can be employed. Because a resin having good distribution of composition cannot be prepared when the vessel is too large, if the vessel is cylindrical, its diameter is suitably from 1 to 70 mm.

It is necessary that the transparent polymer constituting the vessel wall to be brought into contact with the monomer, can be dissolved in the monomer to be polymerized. The refractive index of the transparent polymer is different by 0.005 from the refractive index of the homopolymer made from the monomer that is fed into the vessel. When the difference of refractive indexes is smaller than this value, satisfactory distribution of refractive index cannot be attained, even if a distinct distribution of composition can be obtained. It is only necessary for the transparent polymer that the difference in refractive index is in the above relation, and the value may be either higher than or lower than the refractive index of the above homopolymer.

The above transparent polymer has a property to dissolve in the monomer to be polymerized. For this reason, those having too large molecular weights are not desirable because the solubility in the monomer is low. In the case that the molecular weight is too small, the mechanical strength is insufficient for forming the wall of vessel. In view of these points, it is generally suitable that the value of average molecular weight is selected from the range of 10,000 to 1,000,000. This transparent polymer is generally one or more kinds of monofunctional monomer having one or two radical polymerizable active groups so that it may dissolve in the monomer.

In the polymerization of the invention, it is possible to use a solvent. In the case that a solvent is used, the removal of the solvent is necessary after the polymerization and there occurs some ill effect in the removal of the solvent. It is, therefore, generally advisable that the polymerization is done using the monomer itself as a solvent without using any other solvent.

In the first place, energy to produce radicals such as heat or ultraviolet rays is locally applied from the side of vessel wall by an appropriate known means so as to produce a portion of high temperature or a portion of intense ultraviolet rays in the monomer liquid mixture near the vessel wall, thereby forming radicals of high concentration in such portions and the polymerization is caused to proceed preferentially. It is possible in the case of a cylindrical or a spherical vessel that the vessel is rotated in order to make even of the conditions of heating and irradiation. However, it is not desirable to give the vessel mechanical movement such as stirring or vibration or immoderate rotation to destroy or disturb the gel condition of the monomer.

The wave length of ultraviolet rays and the temperature of heating for the radical polymerization can be optionally selected in accordance with the kind of used monomer. For example, the heating temperature is in the range of room temperature to 150° C. In any case, a known radical polymerization initiator such as benzoyl peroxide (BPO) or a photopolymerization sensitizer can be used as occasion demands. Both the photopolymerization and the thermal polymerization can be caused to occur simultaneously.

When the radical polymerization proceeds to increase the viscosity of monomer liquid mixture and the gel condition is produced, the polymer propagation radical is hardly diffused in the gel and the probability to terminate the reaction in the polymerization becomes small. As a result, the rate of polymerization in the gel portion is raised. The radical propagation terminals in the gel are further connected with unreacted monomers in the gel to proceed the polymerization and a resin is finally produced. At the same time, the gel is polymerized successively in the direction of the progress of polymerization on the front face of polymerized resin. It is, thus, possible to forward successively the polymerization in the direction from the vessel wall to the inside of the vessel utilizing the gel effect. The polymerization initiating terminal may be the side of the wall in a vessel wherein the dissolving of the foregoing transparent polymer is initiated.

The term gel herein referred to means an oligomer or polymer in which the viscosity is raised to such a degree that the polymer propagating radical cannot substantially be diffused. Accordingly, the gel referred to in the present invention is not the polymer having three-dimensional network structure. In some case, the produced gel is separated out from the monomer mixture. However, the polymer in which the polymerization degree is so high that the migration of monomer is impossible in the produced gel, is not included. By the way, too large a rate of polymerization is not desirable because the polymerization is completed without forming a distinct gel condition. In view of this, the rate of polymerization may be determined to take properly such a time of polymerization that the monomer can be sufficiently migrated in the gel. It is generally selected from the range of 1 to 100 hours.

As described above, the monomer used in the present invention is the one which dissolves the transparent polymer of the vessel wall. When the monomer is homopolymerized, the refractive index of the homopolymer is different by at least 0.005 from the refractive index of the transparent polymer.

In a more desirable combination of the monomer and the transparent polymer of the vessel wall, the solubility parameter $\delta_M$ of the monomer and the solubility parameter $\delta_P$ of the polymer constituting the vessel meet the following equation (1).

$$|\delta_M - \delta_P| < 5 \ (cal/cm^3)^{\frac{1}{2}} \qquad (1)$$

In the above equation, the solubility parameters of the monomer and the polymer can be calculated by the following equation [cf: Method of HOY et al. (POLYMER HANDBOOK, Third edition, VII/519, published by Wiley Interscience)].

$$\delta = \frac{d \Sigma G}{M}$$

In the above equation, d and M are respectively density and molecular weight of monomer or polymer. G is Group Molar Attraction Constant.

When a monomer and a transparent polymer which do not meet the above range are used, it is not desirable because a resin having unsatisfactory distribution of composition is obtained.

For reference purpose, solubility parameters of some radical polymerizable monomers are shown in the following Table 1.

| Monomer | Solubility Parameter $(cal/cm^3)^{\frac{1}{2}}$ | | Refractive Index of Polymer n |
|---|---|---|---|
| | Monomer | Polymer | |
| MMA | 7.88 | 9.20 | 1.490 |
| BzMA | 8.87 | 9.54 | 1.568 |
| PhMA | 9.13 | 9.65 | 1.571 |
| 3FMA | — | 7.8 | 1.42 |
| St | 8.15 | 9.28 | 1.591 |
| CHMA | 8.25 | 9.04 | 1.507 |
| 1-PhEtMA | 8.52 | 9.29 | 1.549 |

In the Table, MMA=methylmethacrylate, BzMA=benzylmethacrylate, PhMA=phenylmethacrylate, FMA=1,1,2-trifluoroethylmethacrylate, St=styrene, CHMA=cyclohexylmethacrylate, and 1-PhEtMA=1-phenylethylmethacrylate.

The monomers and transparent polymer used in the invention must meet only the conditions defined in the present invention and there is no limitation besides them.

The radical polymerizable monomers used in the present invention are monofunctional monomers having one functional group which is active in radical polymerization such as the double bond of allyl group, vinyl group, acrylic group, and methacrylic group. The polyfunctional monomers which form three-dimensional network polymer are not included. However, a small quantity of these polyfunctional monomers can be added without departing from the scope of the present invention.

In the following, exemplar combinations of monomers and transparent polymers which can be used in the present invention are shown.

| Monomer | Transparent Polymer |
|---|---|
| MMA | MMA/3FMA copolymer |
| MMA | MMA/PhMA copolymer |
| MMA | MMA/BzMA copolymer |
| MMA + BzMA (mixture) | MMA/BzMA copolymer (composition is different from that of monomer mixture) |
| MMA + BzMA (mixture) | MMA homopolymer |
| MMA + 3FMA (mixture) | MMA homopolymer |
| MMA + 3FMA (mixture) | MMA/3FMA copolymer (composition is different from that of monomer mixture) |
| MMA + PhMA (mixture) | MMA homopolymer |
| MMA + PhMA (mixture) | MMA/PhMA copolymer (composition is different from that of monomer mixture) |
| St | MMA/St copolymer |
| St + MMA (mixture) | MMA/St copolymer (composition is different from that of monomer mixture) |
| St + MMA (mixture) | MMA homopolymer |

Among them, the constitution of the polymerization with the methylmethacrylate/benzylmethacrylate copolymer as the polymer of vessel wall and only a monomer of methylmethacrylate is especially desirable because the monomer and the polymer are readily available and the transparency of obtained optical transmission medium is good.

With one kind of monomer was taken in the above description in order to facilitate the explanation. It should be noted, however, that the number of monomer is not restricted to one but two or more optional kinds of monomers can be used as mixtures, as shown in the above examples provided that they meet the conditions according to the present invention. When a mixture of two or more kinds of monomers is used, each monomer must meet the above conditions. Furthermore, the polymer forming the vessel wall may be either homopolymer or copolymer as far as it meets the foregoing conditions.

As far as no ill effect is produced in the transparency of the product polymer, optional additives such as radical polymerization initiator, chain transfer agent, antioxidant or else can be added.

For example, when the polymerization is caused to proceed in the radial direction of a cylindrical vessel, a transparent resin rod having radially graded refractive index can be produced. This rod can be used as an optical transmission medium as it stands or by applying proper processing. For example, the obtained rod is drawn at an optional drawing ratio by a known method into fibers to produce optical transmission fibers made of a synthetic resin.

A cylindrical transmission medium having refractive index distribution of convex type, where the central portion is high in refractive index, is used for a bar lens and optical fiber for optical communication having the function of convex lens. A cylindrical transmission medium having refractive index distribution of concave type, where the central portion is low in refractive index., is used for a bar lens and optical transmission media having the function of concave lens.

When the reaction is carried out in a rectangular vessel, a plate lens having the function of convex lens or concave lens, is produced.

BEST MODE FOR CARRYING OUT THE INVENTION

The present invention will be described in more detail with reference to examples.

EXAMPLE 1

Methylmethacrylate (MMA) and 1,1,2-trifluoroethylmethacrylate (3FMA) in the weight ratios of 4:1 were fed into a horizontally held glass tube and both ends of the tube were sealed up. Thermal polymerization was done with rotating the tube at 1000 rpm according to an ordinary method. A polymer tube of MMA/3FMA of 10 mm in outer diameter and 6 mm in inner diameter, and 100,000 in molecular weight was prepared.

The outer glass tube was cracked and removed. Only MMA was filled into the horizontally held copolymer tube. After adding 0.15 wt.% of a chain transfer agent of n-butylmercaptan and 0.50 wt.% of a polymerization initiating agent of benzoyl peroxide (BPO), thermal polymerization was done at 70° C. for 20 hours in the atmosphere. During the polymerization, the copolymer tube was rotated at 1000 rpm.

After the polymerization, it was subjected to thermal treatment under a reduced pressure of 0.2 mm Hg, at 80° C. for 20 hours. The content of monomer remaining in the produced polymer was measured, which was less than 0.5 wt. %.

The polymer tube and the polymer in the tube were integrally combined. Both end portions of this were cut off and it was thermally drawn with a cylindrical heating tube by indirect heating at 250° C. to obtain an optical fiber of 0.6 mm in diameter.

The distribution of refractive index in radial direction of the obtained optical fiber was measured by lateral interference method. The resultant distribution is shown in FIG. 1, which was even throughout the whole length of the fiber.

EXAMPLE 2

MMA and benzylmethacrylate (BzMA) in a weight ratio of 4:1 were fed into a horizontally held glass tube and both ends of the tube were sealed up. Thermal polymerization was done with rotating the tube at 1000 rpm according to an ordinary method. A polymer tube of 10 mm in outer diameter and 6 mm in inner diameter composed of MMA/BzMA copolymer of 100,000 in molecular weight was prepared.

The outer glass tube was cracked and removed. Only MMA was filled into a horizontally held copolymer tube. Polymerization was carried out in the like manner as in Example 1 with rotation. The content of monomer remaining in the produced polymer was less than 0.5 wt. %.

By treating in the like manner as in Example 1, an optical fiber of 0.6 mm in diameter was obtained.

Figure 2:
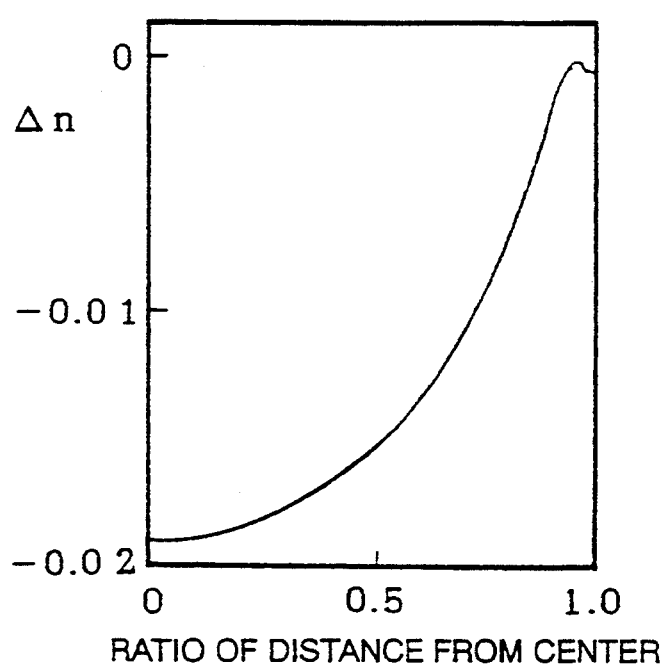
FIG. 2 shows distribution of refractive index in the direction of radius of an optical fiber, which is prepared in Example 1 and Example 2, respectively. In both the drawings, the axis of ordinate indicates the differences (An) between the highest refractive index and refractive indexes at specific distances.

The distribution of refractive index in radial direction of the obtained optical fiber was measured by lateral interference method. The resultant distribution is shown in FIG. 2, which was even throughout the whole length of the fiber.

EXAMPLES 3 TO 6

Using "Monomers Forming Polymer Tubes" in the following Table, polymer tubes of 10 mm in outer diameter, 6 mm in inner diameter, and 100,000 in molecular weight were prepared in the like manner as in Example 1. In Example 3, the polymer tube was made of MMA homopolymer; in Example 4, St/CHMA copolymer; in Example 5, MMA/3FMA copolymer; and in Example 6, MMA/5FMA copolymer.

"Monomers Forming Inside of Polymer" shown in the following Table were filled into the polymer tubes, respectively, and thermal polymerization was carried out in the like manner as in Example 1. The monomer used in Example 3 was MMA/St; in Example 4, St; in Example 5, MMA/BzMA; and in Example 6, MMA.

After thermal polymerization, optical fibers of 0.6 mm in diameter were obtained respectively in the like manner as in Example 1.

The distribution of refractive indexes in the radial direction of the obtained optical fibers was measured, as a result, it was understood that all had the distribution of refractive indexes of convex type similar to that of Example 1.

| Example | Monomer Forming Polymer Tubes | | Monomer Forming Inside of Polymer | |
| --- | --- | --- | --- | --- |
|  | Kind | Wt. Ratio | Kind | Wt. Ratio |
| 3 | MMA | — | MMA/St | 4:1 |
| 4 | St/CHMA | 4:1 | St | — |
| 5 | MMA/3FMA | 4:1 | MMA/BzMA | 4:1 |
| 6 | MMA/5FMA | 4:1 | MMA | — |

In the Table, 5FMA is 2,2,3,3,3-pentafluoropropylmethacrylate.

EXAMPLES 7 TO 9

Using "Monomers Forming Polymer Tubes" in the following Table, polymer tubes of 10 mm in outer diameter, 6 mm in inner diameter, and 100,000 in molecular weight were prepared respectively in the like manner as in Example 2. In Example 7, the polymer tube was made of MMA/PhMA copolymer; in Example 8, MMA/St copolymer; and in Example 9, MMA/1-PhEtMA copolymer.

MMA of "Monomer Forming Inside of Polymer" in the following Table was filled into the polymer tubes, and thermal polymerization was carried out in the like manner as in Example 2.

After the thermal polymerization, optical fibers of 0.6 mm in diameter were obtained respectively in the like manner as in Example 2.

The distribution of refractive indexes in the radial direction of the obtained optical fibers was measured, as a result, it was understood that all of them had the distribution of refractive indexes of concave type similar to that of Example 2.

| Example | Monomer Forming Polymer Tubes | | Monomer Forming Inside of Polymer |
|---|---|---|---|
| | Kind | Wt. Ratio | Monomer |
| 7 | MMA/PhMA | 4:1 | MMA |
| 8 | MMA/St | 4:1 | MMA |
| 9 | MMA/1-PhEtMA | 4:1 | MMA |

INDUSTRIAL APPLICABILITY

According to the present invention, the defects of phase separation and clouding due to the formation of homopolymer, the problem of remaining monomers due to the large difference in polymerization rates and the necessity of a long time for the completion of reaction in the use of monomers which are low in the monomer copolymerizability in the conventional art, were eliminated. Thus a large improvement was obtained in that a desirable optical transmission medium having refractive index gradient such as optical fibers of multimode graded index (GI) type.

According to the present invention, it was made possible to carry out the polymerization with substantially one kind of monomer, as a result, the watching and the controlling of polymerization process were made quite easy as compared with the case in which a plurality of monomers are used.

We claim:

1. A method of manufacturing a multimode optical transmission medium formed from a synthetic resin having a distribution of refractive index varying continuously in a fixed direction comprising feeding a monomeric liquid selected from the group consisting of a monofunctional monomer and a mixture of two or more monofunctional monomers into a vessel formed of a transparent thermoplastic polymer, said monomeric liquid characterized by it being homopolymerizable into a polymer having a refractive index which differs from said transparent thermoplastic polymer by at least 0.005 and by its ability to dissolve said transparent thermoplastic polymer; radically polymerizing said monomeric liquid whereby a gel layer is formed adjacent to the inside wall of said vessel; and continuing said polymerization such that said gel layer is shifted from said inside wall of said vessel to the inner portion of said vessel whereby the concentration of said transparent thermoplastic polymer component in the synthetic resin is lowered in the direction of movement of the gel.

2. The method as claimed in claim 1, wherein the polymer made from said monomer liquid is miscible with said transparent polymer constituting said vessel wall.

3. The method as claimed in claim 1 wherein said monomer has a solubility parameter $\delta_M$ and said transparent polymer has a solubility parameter $\delta_P$ which satisfies the following relationship, $$|\delta_M - \delta_P| < 5 \; (cal/cm^3)^{\frac{1}{2}}$$

4. The method as claimed in claim 1, wherein said monomeric liquid is methylmethacrylate and said transparent polymer constituting the vessel wall is a copolymer of methylmethacrylate with benzylmethacrylate or a copolymer of methyl-methacrylate with 1,1,2-trifluoroethylmethacrylate.

* * * * *

UNITED STATES PATENT AND TRADEMARK OFFICE
CERTIFICATE OF CORRECTION

PATENT NO. : 5,382,448
DATED : January 17, 1995
INVENTOR(S) : Yasuhiro Koike, et al.

It is certified that error appears in the above-indentified patent and that said Letters Patent is hereby corrected as shown below:

Column 2, line 26: after "Japanese" delete --.--
Column 2, line 53: ".as" should read --as--
Column 3, line 1: ".in" should read --in--
Column 3, line 33: "(An)" should read --( $\Delta$ n)--
Column 3, line 60: "will-be" should read --will be--
Column 4, line 3: after "prepared" delete --.--
Column 6, line 16: "FMA" should read --3FMA--
Column 7, line 27: after "index" delete --.--
Column 10, line 25: "monomer" should read --monomeric--
Column 10, line 29, Claim 3: "monomer" should read --monomeric liquid--

Signed and Sealed this

Sixteenth Day of April, 1996

BRUCE LEHMAN

Attest:

Attesting Officer

Commissioner of Patents and Trademarks